US005847708A

United States Patent [19]

Wolff

[11] Patent Number: 5,847,708
[45] Date of Patent: Dec. 8, 1998

[54] METHOD AND APPARATUS FOR SORTING INFORMATION

[75] Inventor: Gregory J. Wolff, Mountain View, Calif.

[73] Assignees: Ricoh Corporation, Menlo Park, Calif.; Ricoh Company Ltd., Tokyo, Japan

[21] Appl. No.: 719,560

[22] Filed: Sep. 25, 1996

[51] Int. Cl.[6] .................................. G06F 7/00; G06F 3/14
[52] U.S. Cl. .......................... 345/349; 345/339; 345/968
[58] Field of Search ..................... 345/348, 349, 345/350, 357, 968, 440, 140; 395/606, 607, 140

[56] References Cited

U.S. PATENT DOCUMENTS

| 5,481,666 | 1/1996 | Nguyen et al. | 345/357 |
| 5,579,471 | 11/1996 | Barber et al. | 345/326 |
| 5,598,557 | 1/1997 | Doner et al. | 345/348 |
| 5,636,350 | 6/1997 | Eick et al. | 345/356 |

*Primary Examiner*—Raymond J. Bayerl
*Assistant Examiner*—Cao H. Nguyen
*Attorney, Agent, or Firm*—Blakely, Sokoloff, Taylor & Zafman LLP

[57] ABSTRACT

A sorting technique in which a computer system or other data processing device interacts with a user to develop a spatial structure to represent information, such as a set of documents, according to a particular user's viewpoint. As a result of developing the spatial structure, and based on the structure, the system is able to sort other information, including its placement with respect to the other information in the spatial structure. The spatial structure also enables retrieval, searching and filtering information.

44 Claims, 5 Drawing Sheets

METHOD AND APPARATUS FOR SORTING INFORMATION

FIELD OF THE INVENTION

The present invention relates to the field of document sorting systems; more particularly, the present invention relates to sorting documents on an interconnected computer network, such as the World Wide Web, or other similar document resource supply.

BACKGROUND OF THE INVENTION

An important use of computers is the transfer of information over a network. Currently, the largest computer network in existence is the Internet. The Internet is a worldwide interconnection of computer networks that communicate using a common protocol. Millions of computers, from low end personal computers to high-end super computers, are coupled to the Internet.

The Internet grew out of work funded in the 1960s by the U.S. Defense Department's Advanced Research Projects Agency. For a long time, the Internet was used by researchers in universities and national laboratories to share information. As the existence of the Internet became more widely known, many users outside of the academic/research community (e.g., employees of large corporations) started to use the Internet to carry electronic mail.

In 1989, a new type of information system known as the World-Wide Web ("the Web") was introduced to the Internet. Early development of the Web took place at CERN, the European Particle Physics Laboratory. The Web is a wide-area hypermedia information retrieval system aimed to give wide access to a large universe of documents. At this time, the Web was known to and used by the academic/research community only. There was no easily available tool which allows a technically untrained person to access the Web.

In 1993, researchers at the National Center for Supercomputing Applications (NCSA) released a Web browser called "Mosiac" that implemented a graphical user interface (GUI). Mosiac's graphical user interface was simple to learn yet powerful. The Mosiac browser allows a user to retrieve documents from the Web using simple point-and-click commands. Since then many other Web browsers have been developed, such as the Netscape Navigator by Netscape of Mountain View, Calif.

The architecture of the Web follows a conventional client-server model. The terms "client" and "server" are used to refer to a computer's general role as a requester of data (the client) or provider of data (the server). In the Web environment, Web browsers are clients and Web documents reside on servers. Web clients and Web servers communicate using a protocol called "Hypertext Transfer Protocol" (HTTP). A browser opens a connection to a server and initiates a request for a document. The server delivers the requested document, typically in the form of a text document coded in a standard Hypertext Markup Language (HTML) format.

Portions of documents displayed on the Web contain hypertext links. The hypertext links link graphics or text on one document with another document on the Web. Each hypertext link is associated with a Universal Resource Locator (URL). A URL specifies a server and a particular document on that server. When a user selects a hypertext link, using, for instance, a cursor, the graphical browser connects to the server and retrieves the document(s) specified by the URL(s).

Some servers provide a means for searching a collection of documents. Upon initial request, the server supplies a form to the browser. The user, using the graphical browser, enters data such as keywords on this form as part of a search query and then opens a new connection to the server and submits this data to the server. The server responds to this request with a new document listing, some or all of the documents matching those key words or other data requested by the browser. Each document listed normally includes a hypertext link to the actual document so that the user may easily retrieve that document (as they would any other link).

Today, finding information has become a crucial problem. The World Wide Web contains millions of documents spread over hundreds of thousands of computers throughout the world. Although hypertext links tie all these documents together, the distributed architecture of the Web produces an incoherent system which often makes it very difficult for user's to locate documents of interest. What is need is any easy way to access documents, such as those on the Web.

A user typically sorts and structures their documents, whether the documents are the result of a Web search or otherwise. One type of structure currently being used with the Web is a "hot-list," which is a list of hypertext links to frequently accessed Web documents for a user. Currently, users wishing to structure a set of documents, such as their "hot-lists", must manually shuffle items in a time consuming and laborious task. The larger the list, the more time consuming and laborious the task. Thus, while the Web brings new information sources to desktops at an exponential rate, the methods available for retrieval and structuring that information, i.e. turning the information into useful knowledge, have failed to keep pace.

Many researchers have looked to sophisticated information or information filtering methodologies to close the gap. For example, see G. Salton, J. Allen, C. Buckley, "Automatic Structuring and Retrievel of Large Text Files," Technical Report TR-92-1286, Cornell, June 1992. Crucial to these methods are the underlying metrics which are used to judge the relevance of a particular document to a user's needs. These metrics are the features of information being structured. For instance, subject matter may be used as a metric. An individual user knows very well how documents relate to each other. However, similarity judgments vary from individual to individual. For example, someone writing a manual on digital cameras might consider descriptions of PCMCIA cards to be closely related to JPEG file formats, while someone not familiar with the subject matter may conclude otherwise. This knowledge is attributable to the user understanding of certain metrics associated with both descriptions. It is very difficult to teach machines and computer systems such similarity metrics or give them the ability to make judgments regarding similarity that correspond to a particular individual.

One method for mapping similarity metrics into spatial layouts is referred to as multidimensional scaling (MDS). Most MDS techniques operate on a fixed set of similarity judgments to produce a fixed spatial representation such that distances between items corresponds to the similarity judgments. In general, MDS techniques do not allow for feedback supplied by a user to constrain the scaling that results. Most MDS problems are concerned with pairwise similarity judgments made by subjects. MDS allows varying the spatial layout to some extent by manipulating the scaling coefficients, but does not provide a means for altering/ learning the similarity metrics. For information on MDS, see, J. Kruskel & M. Wish, "Multidemensional Scaling," Sage Publications, Beverly Hills, Calif., 1978.

The present invention provides for efficient retrieval of information. The present invention also provides a system to sort a user's information, such as documents from the Web. The present invention automatically structures new information according to its relevance to a user's interests. Although the system sorts the user's information, the present invention allows the user to influence the sorting process. Thus, the present invention includes a mechanism for providing user feedback to improve the system.

SUMMARY OF THE INVENTION

A method and apparatus for sorting information is described. The present invention provides a method and apparatus for presenting icons on a display. Each of the icons represents information, such as a document. The present invention also provides a method and apparatus for positioning icons to locations on the display using a similarity measure. The similarity measure may be particular to an individual. In one embodiment, new information may be structured automatically according to the individual's view. In one embodiment, the present invention provides a method and apparatus for providing user feedback into the positioning process. A result of the process may be a multi-dimensional document map of sorted documents.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
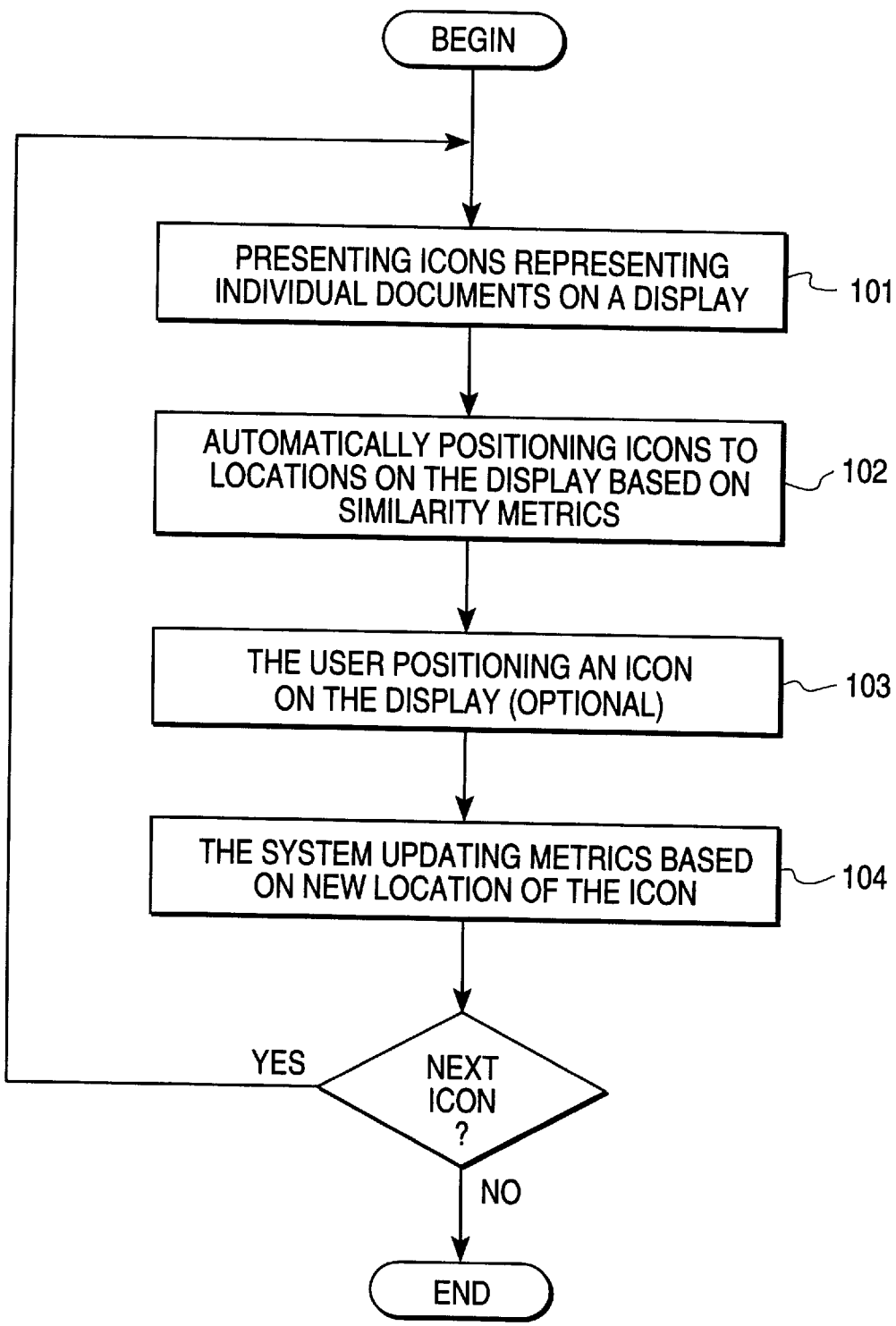
FIG. 1 is a flow chart of one embodiment of the sorting process of the present invention.

A method and apparatus for sorting information is described. In the following detailed description of the present invention numerous specific details are set forth, such as types of search engines, document metrics/features, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Such computer systems typically employ one or more processors to process data, which are coupled to one or more memories via one or more buses.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnet or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

Overview of the Present Invention

The present invention structures information and provides an interactive approach to sorting information. In the present invention, a system learns a spatial structure for some set of documents through interaction with a user. In one embodiment, the structure comprises icons spatially arranged on a display according to at least one underlying metric.

The present invention provides a novel, interactive approach to constructing the metrics which are used to judge the relevance of a particular document to the user's needs. By operating interactively with a user, the system of the present invention learns one or more underlying metrics that approximate the user's own cognitive structuring of the domain. The user begins training the system by placing icons nearby icons of related documents. The system quickly learns these relationships, and begins to suggest locations for new documents. Once developed, this structure can be used to improve conventional information retrieval and filtering methods by tailoring them to a specific user's needs. In addition, the learned structures can serve as a cognitive aid, helping the user to use the information more effectively. Thus, the system enables efficient retrieval, structuring, and use of information for users.

In one embodiment, information being structured and retreived comprise documents. The documents may comprise Web documents. The term "document" refers to any electronic representation of information and may include text files, graphical images, mixed graphic and text files, or any other files, home pages, html.doc, etc.

The present invention improves personal information management, including the user's ability to find and organize documents, by using a user's unique individual perspective to create cognitive maps reflecting, in some manner, the way the user thinks. In one embodiment, the cognitive maps may be 2 or 3 dimensional layouts of document icons arranged according to the user's notion of document similarity. It should be noted that there are numerous ways to project an N dimensional space into two (or three) dimensions.

Overview of Client-Server Operation

The present invention has applicability to sorting information and handling documents on the Web, and other networked informational sources. Therefore, the following brief explanation regarding client-server operation, URL's and browsing of the Web has been included.

Conceptually, a computer network, such as the Internet, includes small computers and large computers, commonly used as servers. In general, small computers are "personal computers" or workstations and are the sites at which a human user operates the computer to make requests for data from other computers or servers on the network. Usually, the requested data resides in large computers. In this scenario, small computers are clients and the large computers are servers. In this specification, the terms "client" and "server" are used to refer to a computer's general role as a requester of data (client) or provider of data (server). In general, the size of a computer or the resources associated with it do not preclude the computer's ability to act as a client or a server. Further, each computer may request data in one transaction and provide data in another transaction, thus changing the computer's role from client or server, or vice versa.

The World Wide Web ("Web") uses the client-server model to communicate information between clients and servers. Web servers are coupled to the Internet and respond to document requests from Web clients. Web clients (e.g., Web "browsers") are programs that allow a user to simply access Web documents located on Web servers.

An example of a client-server system interconnected through the Internet may include a remote server system interconnected through the Internet to a client system. The client system may include conventional components such as a processor, a memory (e.g., RAM), a bus which coupled the a processor and memory, a mass storage device (e.g., a magnetic hard disk or an optical storage disk) coupled to the processor and memory through an I/O controller and a network interface, such as a conventional modem. The server system also may include conventional components such as a processor, memory (e.g., RAM), a bus which coupled the processor and memory, a mass storage device (e.g., a magnetic or optical disk) coupled to the processor and memory through an I/O controller and a network interface, such as a conventional modem. It will be appreciated from the description below that the present invention may be implemented in software which is stored as executable instructions on a computer readable medium on the client and server systems, such as mass storage devices respectively, or in memories respectively.

To define the addresses of resources on the Internet, Uniform Resource Locator (URL) system are used. A URL is a descriptor that specifically defines a type of Internet resource and its location. URLs have the following format:

protocol://domain.address/path_name

Where "protocol" defines the protocol of communication between the server and client. Web documents are often accessed via the "http" protocol (hypertext transfer protocol). Other protocols include "ftp" (file transmission protocol), gopher, "telnet". The "domain.address" defines the domain name address of the computer server that the resource is located on. Finally, the "path_name" defines a directory path within the file system of the server that identifies the resource or more generally an identifier or request. The right most name on the path name portion is usually the name of an actual file, but can also contain key value pairs which are used by the server to generate documents on the fly. By convention, many Web pages end with the suffix ".html" indicating that the file is a HyperText Markup Language document.

An example of a URL for a Web document is:

http://info.tech.ch/hypertext/Data/WWW/History.html

This URL indicates that by using the HTTP (Web) protocol to reach a server called "info.tech.ch", there is a directory "hypertext/Data/WWW" that contains a hypertext document named "History.html." Resources on the Internet are addressable by their URL.

To access an initial Web document, the user enters the URL for a Web document into a Web browser program. The Web browser then sends an http request to the server that has the Web document using the URL. The Web server responds to the http request by sending the requested HTTP object to the client. In most cases, the HTTP object is a plain text (ASCII) document containing text (in ASCII) that is written in HyperText Markup Language (HTML). The HTML document usually contains hyperlinks to other Web documents. The Web browser displays the HTML document on the screen for the user and the hyperlinks to other Web documents are emphasized in some fashion such that the user can identify and select the hyperlinks.

Sorting Information

FIG. 1 is a flow chart of one embodiment of the sorting process of the present invention. In one embodiment, the process of the present invention is implemented in software. Such software may be in the form of a computer program product, as described above. Referring to FIG. 1, the process begins with the system of the present invention presenting icons representing individual document (processing block 101). The present invention uses icons presented on a display to represent documents. In one embodiment, the icons are presented on a predetermined location on the display. In one embodiment, each new icons is placed in the center of the display. In an alternative embodiment, new icons may be placed at a different location on the display (e.g., a corner, side, an empty (or clear) location on the display, etc.). Note that the predetermined location may be the same throughout the process or may change, randomly or otherwise, throughout the process. In one embodiment, to increase the speed of interaction, new icons are presented one at a time in a predetermined position on the display screen. In an alternative embodiment, multiple new icons may be displayed on the display screen at the same time.

Once an icon appears on the display, the system of the present invention moves (animates) the icon towards similar documents (processing block 102). The system determines similarity based on underlying metrics associated with the documents. Using the underlying metrics, a similarity measure is created and used by the system to identify those documents more or less similar to the document associated with the new icon. Thus, the system moves each icon in the direction of more similar documents until a "maximum" of similarity is reached. This is the "preferred position" as determined by the system.

As the icon migrates towards similar documents, the user may optionally intervene and manually place the icon (processing block 103) The user may wish to intervene when the user does not agree with the positioning of an icon by the system. In one embodiment, the user manually moves an icon by positioning a cursor over the icon and clicking the cursor control device by depressing a button on the cursor control device, and while depressing the button on the cursor control device, moving the icon to the desired location, such as is done when performing a click and drag operation.

When a user has placed an item on the display, the system adjusts coefficients of the similarity measure so that the "preferred" position of the icon corresponds more closely to the user determined position (processing block 104). Then the system continues to the next icon (processing block 105). In this manner, the present invention allows for training the system with user preferences so that the system learns to place icons in the space according to the user's desires.

Figure 2:
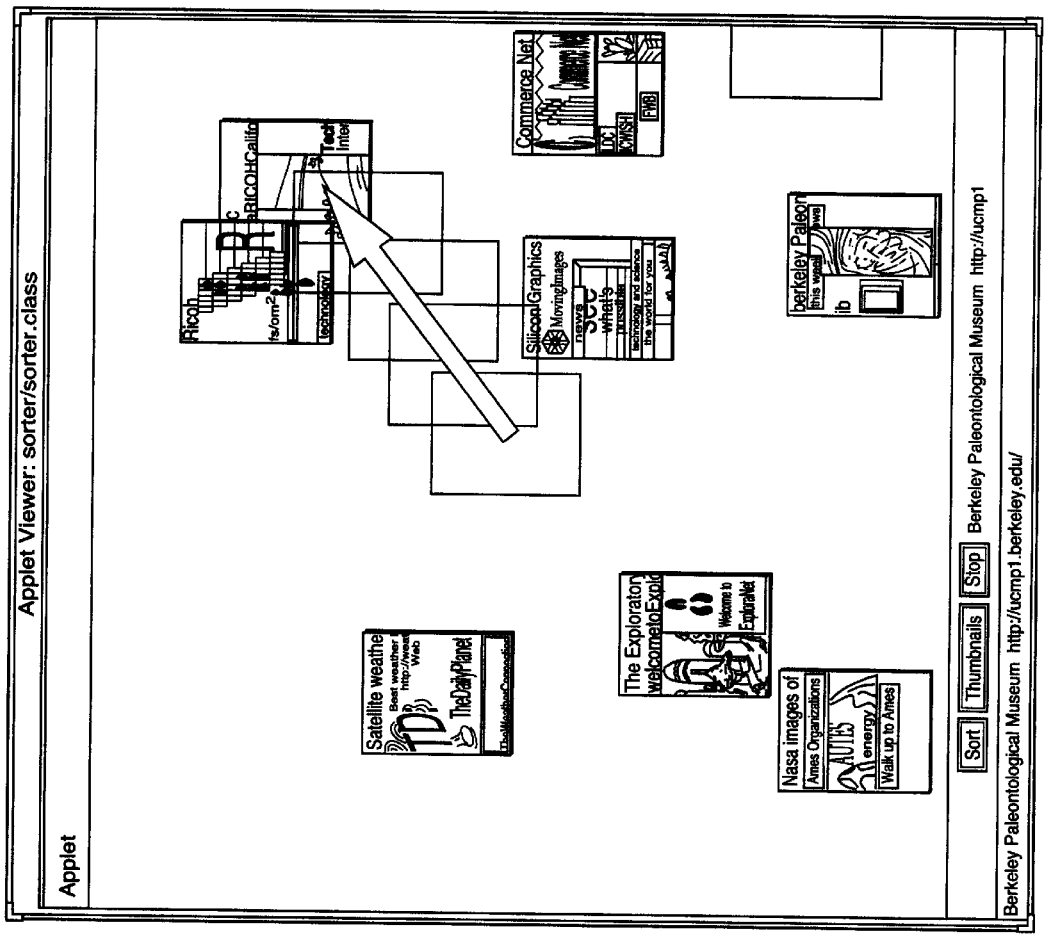
FIG. 2 is an example of a cognitive map of the present invention.

The result of the process is a spatial layout (e.g., 2-D cognitive document map) with icons arranged by context, corresponding to the user's notion of which documents should be close to each other. FIG. 2 illustrates an example of a 2-D cognitive map of the present invention. Note that the animation of the icons moving from the center to their desired position, and the sequential nature of the presentation make the task a manageable one for users.

In the present invention, the icons are generated automatically from the document. In one embodiment, each document icon may be generated in the same manner as a thumbnail. A thumbnail is a small image created from the underlying document. One way to do this is render the document normally (e.g., for 8.5×11 image) and then subsample the pixels (e.g., take 1 of every 20 pixels) to create the small image.

Another method selects only important features of the document (heading, images, etc.) and scales those down to the appropriate size. In one embodiment, the particular algorithm to determine "importance" is simple. First, starting with the title and followed by major headings, and images larger than a couple hundred pixels, the present invention scales the images down by a large factor (force them to fit in icon) to place as many important features into an icon as possible.

Other methods of creating icons include using tiny fonts, using special fonts, selecting a single "logo" image from the document, with the result of the icon creation process being a block of pixels (an image) which can be easily operated on as a unit. Note that determining the mapping from document to icon could be under user control (e.g., what level of headings to use, scaling factor, etc.).

In another embodiment, the icon may be generated in the same manner as an icon is created by operating systems to represent computer files. In still another embodiment, the icons may be created by obtaining a low-resolution image of the document. Icons could also be text, such as a title or URL of a document.

Initially, the user places icons wherever they wish. For example, in FIG. 2, the user placed an icon representing a company's home page in the upper right part of the space. The system of the present invention learned this placement and the document's underlying metrics, so that when a similar document was presented (e.g., a related company's home page), it automatically moved the icon towards the same area.

The present invention provides automatic learning of a structuring of the documents based on features associated with each documents. This structuring depends on a similarity measure defined over the features. In the present invention, any number of metrics would suffice. In one embodiment, a metric takes into account the significant or key terms of the documents, authors, creation dates, links to other documents, size, access times, and other features. The keyword can be a set of words (static or dynamic) such as low frequency nouns or can be determined by context, title words, number of occurrences, etc. In fact, both could be used. In one embodiment, a metric is defined for each location of document, ratio of links to non-links, number and type of clients in documents, reading level estimates, e.g., like grammar checkers or writing assistant programs use and are used to compute the feature. The similarity measure combines those metrics, for example using a weighted sum. In addition to the mapping from similarities to spatial layout, the present invention allows the feature metrics themselves to be optimized.

The feature metrics are combined in a weighted fashion to compute the similarity between documents. In one embodiment, these weights are adjusted to reduce or minimize the difference between this computed distance and the spatial distance of the positioned icons. In one embodiment, the weights are adjusted using iterative search techniques such as gradient descent. Other teachings may be used and would be well-known to those skilled in the art.

The system of the present invention learns to reduce the differences between a distance measure, D, calculated between icons, and a similarity, S, calculated between corresponding documents. Each time the user places an icon, the system calculates the distance between that icon and the other icons. These distances are used to update how the system calculates the similarity measure.

It should be noted that the present invention differs from MDS in the way similarity metrics are obtained. Most MDS problems are concerned with pairwise similarity judgments made by subjects and are only concerned with finding positions in the space consistent with those judgments. In the present invention a spatial arrangement is given and the present invention attempts to find a similarity measure consistent with that layout.

The similarity measures of the present invention are computed over a set of feature metrics. In addition to adjusting the contribution of each feature, the feature metrics themselves may also be optimized.

In the present invention, each feature might have a different feature metric defined on it. For example, the feature metric for dates might be the number of days between the publication of two documents. In one embodiment, term similarity is computed using a vector space model, such as set forth in the Salton reference discussed above. Link similarity might be the minimum number of links which must be crossed to traverse from one document to the other. The number of links has normal arithmetic differences.

The computed similarity distance between two documents is a weighted sum of these feature metrics, where the similarity between documents i and j is given by:

$$S_{ji} = \sum_f w_f \cdot F_f(j,i) \qquad (eq. 1)$$

where each F measures the difference between the two documents on a particular feature, such as keywords, number of links, times visited, etc., and w represents the weight or importance of each feature.

Note that a scaling constant may be included to normalize the different ranges of $F_f$. The weight $w_f$ may be constrained to sum to 1 in order to bound $S_{ji}$.

The Euclidean distance between two documents on the display is given by the following equation:

$$D_{ji} = \sqrt{(x_j - x_i)^2 + (y_j - y_i)^2} \qquad (eq. 2)$$

Energy represents the discrepancy (squared error) between the similarity S and the distance D across all documents and is given by the following equation:

$$E_{ji} = \sum_{i,j} (D_{ji} - S_{ji})^2 \qquad (eq. 3)$$

Using gradient descent, or other search techniques, the weightings, $w_f$, for each feature can be updated to reduce or minimize Equation 3 above. Likewise parameters of the similarity measures for individual features could also be updated. These updates could happen periodically, or after each "manual" placement by the user. Also, to reduce computational complexity, the updates might be limited in spatial extent. That is to say, $E_i$ may be approximated by considering only documents within a certain region near j. During learning, the weights, w, are adjusted to minimize or reduce E. When placing a new document, the system starts with the icon in the center, and then moves the icon in a direction which reduces, and ultimately minimizes E (i.e., its preferred position) using gradient descent. In this way, the system of the present invention adjusts its construction of similarity to match that of the user. Note that where finding a global minimum is not possible or feasible, the energy E is reduced as much as possible (e.g., to a local minimum).

Therefore, when a user repositions an icon, the system adapts to the new position by adjusting the similarity measure. The system computes the similarities, combining the feature metrics in a weighted fashion, where the weights are adjusted to reduce or minimize the difference between the similarity and the spatial distance of the positioned icons.

Document Retrieval, Database Searching and Document Filtering

The cognitive document maps of the present invention may be used for retrieval, allowing a user to quickly locate a document they have seen before. The maps may also be used for searching, allowing a user to quickly locate related documents, and may also be used for automated filing and information filtering.

Figure 3:
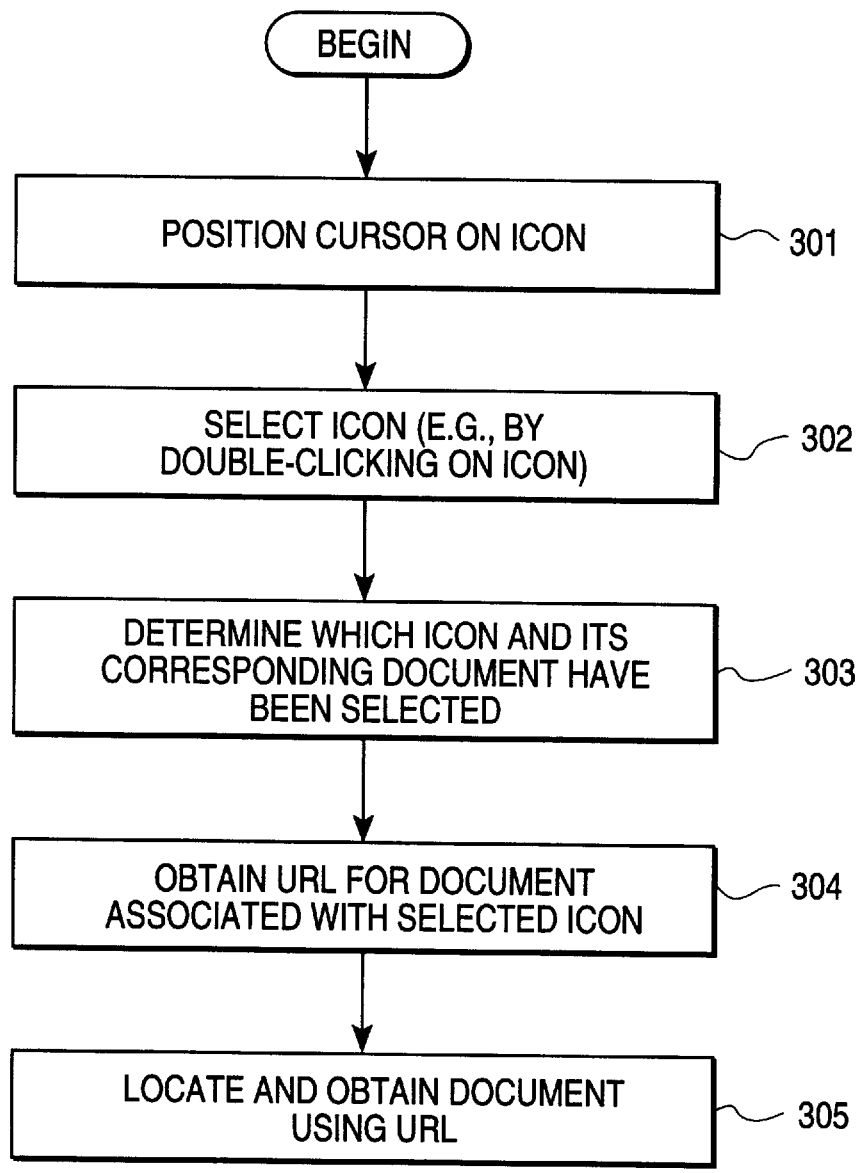
FIG. 3 illustrates one embodiment of the document retrieval process of the present invention.

Using the cognitive maps of the present invention, document retrieval is easy and convenient. FIG. 3 illustrates one embodiment of the document retrieval process of the present invention. Referring to FIG. 3, a user simply positions a cursor on the icon that corresponds to the desired document to be retrieved (processing block 301). A cursor may be controlled by one of any number of cursor control devices, such as, for example, a mouse, trackball, track pad, joy stick, light pen, cursor control keys, etc.

Once the cursor has been positioned, the icon is selected by the user (processing block 302). In one embodiment, selection by the user comprises double-clicking (or depressing) a button on the cursor control device. In an alternative embodiment, the user may select an icon by first highlighting the icon and then depressing one or more keys or buttons to signal the system that a selection has been made.

Upon selecting, the system determines which icon and corresponding document have been selected (processing block 303). In one embodiment, the system maintains a storage memory with indications of where on the screen each icon is and which document is associated with that icon. The system need only determine the point on the screen where the cursor lies, a procedure well-known in the art, in order to determine which icon, and thus which document, has been selected.

Upon identifying the desired document, the system obtains its URL (processing block 304). Note that the URL may be stored in memory, such as the one described above containing the document identification and icon position, which would contain URLs for all of the documents. Using the URL, the document is retrieved via a browser in a manner well-known in the art.

Thus, the user simply clicks on an icon to retrieve and display its associated document. Since the layout of the icons corresponds to a structure the user helped to create, the user should find it very easy to locate the desired icons in a much easier fashion than scrolling down a long list of links.

Figure 4:
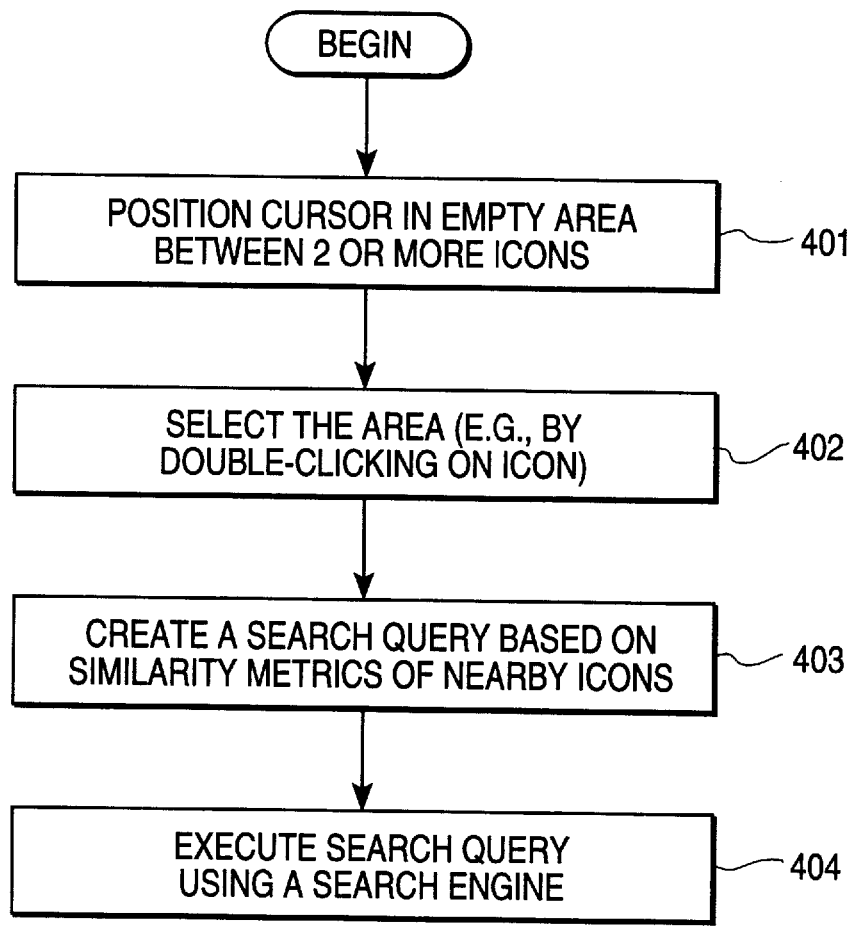
FIG. 4 illustrates a flow chart of one embodiment of a method the document searching process of the present invention.

The user may request a search for new documents that are similar to documents already in the map. A flow chart of one embodiment of a document searching process of the present invention is shown in FIG. 4. Referring to FIG. 4, the document searching process begins by the user positioning a cursor in an empty area on the display (i.e., no icons) between two or more icons (processing block 401). Once positioned, the user selects the area (processing block 402). As discussed above, such a selection may be made in a number of different ways, such as, for instance, double-clicking on the area, circling the area, etc. Next, the system determines the location of the cursor or circled area in relation to the other icons and, in response to receiving the selection of the area, creates a search query based on similarity metrics of nearby icons (processing block 403). In the case of circling an area, the circle radius can be interpreted as the specificity of the desired search.

Using the search query, a search is performed using a search engine (processing block 404). Thus, by clicking in an empty area, the user requests that the system find documents with high similarity measures to the nearby documents.

In one embodiment, a prompt may be displayed any time the user clicks on the screen. If the user clicked on an icon, the prompt may ask the user whether the user desires the document or desires a search for documents which are similar to the icon. If the user clicked on an open area, a similar prompt may appear. In alternative embodiments, the prompts may appear in response to clicking on different buttons, pressing predetermined keys, menu choices, etc.

The system may use various search engines to explore on the Web for documents with high similarity measures to the nearby documents. For example, search engines such as the Netscape Navigator by Netscape, Yahoo, Magellan, Alta Vista (DEC), Infoseek, Web Crawler may be used.

In one embodiment, the query created by the present invention comprises a http query (e.g., a URL) like those generated by screen-based browsers.

An example URL is as follows:

http://www.yahoo.com/bin/search?p=keyword where the "keyword" is obtained from the metrics. If there were multiple keywords, then "p=keyword" portions would be included in the URL separated by an identifier of one or more characters (e.g., the character "?").

Note that in performing a search, the metrics are used in an inverse fashion in that the system computes the inverse problem of finding which features a document would need so that it would fill user the specified regions. These features can then be used in database searching.

Furthermore, this type of search query differs from traditional boolean searches. In order to gain the specificity required to identify documents which would fall in a user specified region, the system may generate complex queries with positively weighted terms from nearby documents and negatively weighted terms from more distant ones.

In one embodiment, the weights of the weighted terms may be adjusted based on how close the user's cursor selected area (i.e., cursor location) is to one of the icons. In other words, if the user selects between two icons, yet the selected area is closer to one of the icons, the weights are adjusted to place more emphasis on those search terms of the closer item. In another embodiment, only the nearby documents are used to generate a search query and they are not weighted.

In one embodiment, the user may refine searches by first placing a few of the returned documents in their system space, and then specifying a new query region. By specifying a larger or smaller region, user's can control the focus of the search.

The similarity measure of the present invention may be used to filter documents. For instance, regions of the space can be marked as high-priority. High priority documents may represent those documents that the user finds interesting. Other regions in the space may be marked low-priority. A filtering application might then apply the underlying metrics to determine the preferred position of each new article. New documents in the high priority space will be brought to the user's attention immediately, while new documents in the low-priority regions might be discarded.

In addition, the metrics of the present invention may be used as cognitive aids for the user or to generate novel views or hierarchies of the information. New views may be created by allowing the user to explicitly manipulate the weighting of the similarity measures. In such a case, a pop-out or scroll-down menu may be included in the system and accessible to the user.

Hierarchies or other dimensions may be created by opening multiple windows (or depths) or alternatives for icon placement. By defining distances between these alternative icon placement, the distances may be implemented into the equations above. Also, users might generate several different views. For instance, a user may generate a view for each domain in which they work. Such views may be incorporated into their own documents.

One Embodiment of the System of the Present Invention

Figure 5:
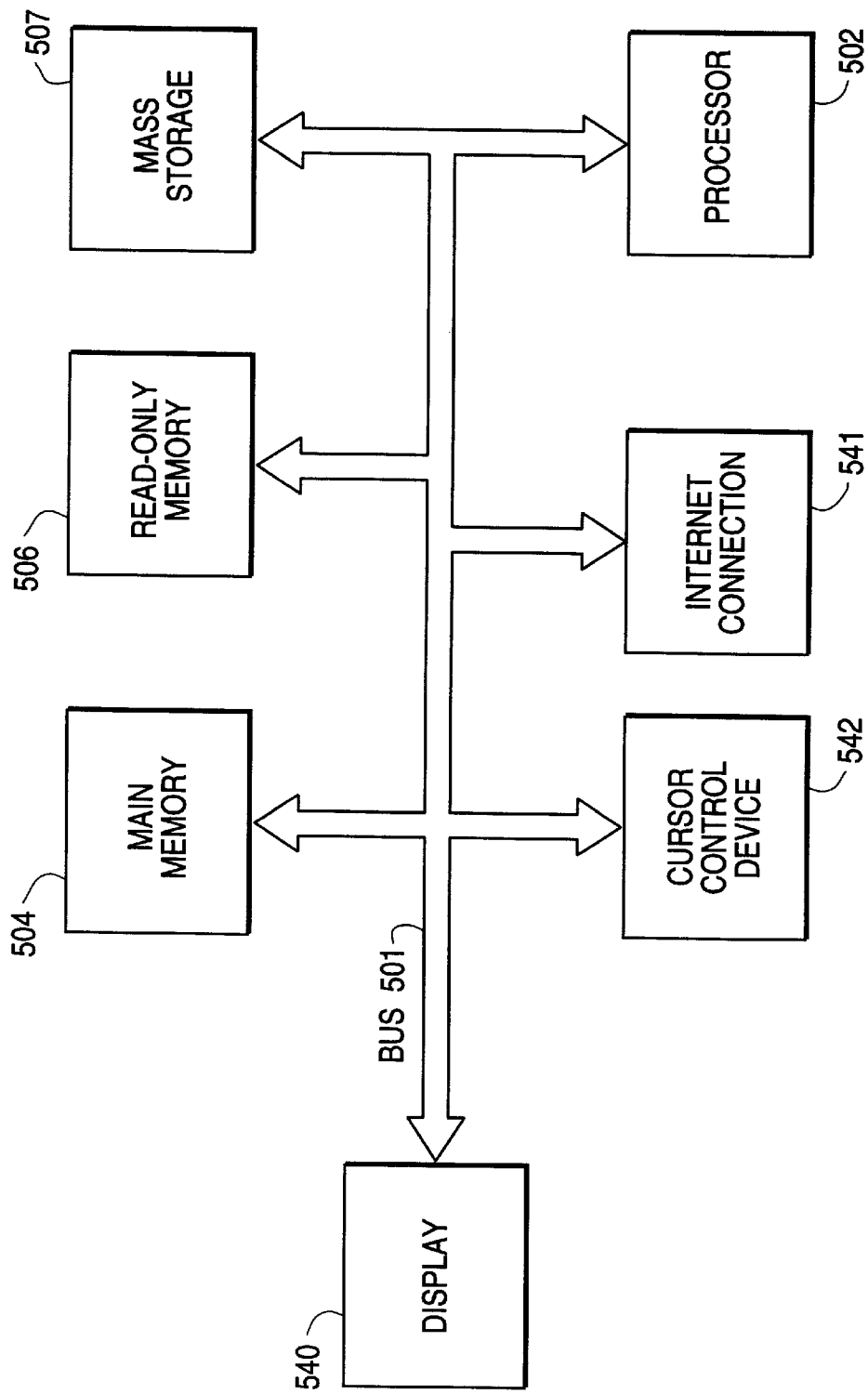
FIG. 5 is a block diagram of one embodiment of the computer system that may incorporate the teachings of the present invention.

One embodiment of the system of the present invention comprises a computer system or workstation having at least a processor, random access memory, and a bus, and runs an operating system, etc. FIG. 5 is a block diagram of an exemplary computer system that may incorporate the teachings of the present invention. Referring to FIG. 5, computer system 500 comprises a bus or other communication means 501 for communicating information, and a processor(s) 502 or other processing element(s) coupled with bus 501 for processing information.

System 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computer system 500 also comprises a read only memory (ROM) and/or other static storage device 506 coupled to bus 501 for storing static information and instructions for processor 502, and a data storage device 507 such as a magnetic disk or optical disk and its corresponding disk drive. Data storage device 507 is coupled to bus 501 for storing information and instructions.

Computer system 500 also comprises an Internet connection 541. Internet connection 541 may be a local area connection (e.g., ethernet) or maybe an ISDN line. In another embodiment, Internet connection 541 may be a modem running PPP or SLIP. The present invention is not limited to use with the Internet and, thus, the connection 541 may be for use in connection to any network using the TCP/IP or other protocols, to which a "router" p is connected that allow s communication with some other network. The two networks form an "Inter-Network". Internet refers to the largest, global set of such connected networks which may pas s information back and forth between them. The methods of connecting to a network include a physical communications link, such as ethernet, ISDN, modem and phone lines, or wireless modems, and TCP/IP, SLIP, or PPP software.

Computer system 500 may further include various input/output peripherals, such as a display device 540, such as a cathode ray tube (CRT) or liquid crystal display (LCD) coupled to bus 501 for displaying information to a computer user.

An alphanumeric input device, including alphanumeric and other keys, may also be coupled to bus 501 for communicating information and command selections to processor 502. An additional user input device is cursor control 542, such as a mouse, trackball, trackpad, stylus, joy stick or cursor direction keys on a keyboard or keypad, coupled to bus 501 for communicating direction information and command selections to processor 502, and for controlling cursor movement on the display 540. Another device which may be coupled to bus 501 is hard copy device which may be used for printing instructions, data, or other information on a medium such as paper, film, or similar types of media.

Note that any or all of the components of system 500 and associated hardware may be used; however, it can be appreciated that any type of configuration of the system may be used for various purposes as the user requires. For instance, a network is not necessarily required if all of the documents are available locally.

According to one embodiment, the process of the present invention is performed by computer system 500 in response to processor 502 executing sequences of instructions contained in memory 504. Execution of the sequences of instructions contained in memory 504 causes processor 502 to perform sorting, searching, document retrieval etc., as will be described hereafter.

The instructions may be loaded into memory 504 from a persistent store, such as a disk drive, and/or from one or more other computer systems (collectively referred to as a "host computer system") over a network connection. For example, a host computer system may transmit a sequence of instructions to computer system 500 in response to a message transmitted to the host computer system over a network by computer system 500. As computer system 500 receives the instructions over the network connection, computer system 500 stores the instructions in memory 504. Computer system 500 may store the instructions for later execution, or execute the instructions as they arrive over the network connection.

In some cases, the instructions may be instructions directly supported by processor 502. Consequently, execution of the instructions may be performed directly by processor 502. In other cases, the instructions may not be directly executable by processor 502. Under these circumstances, the instructions may be executed by causing processor 502 to execute an interpreter that interprets the instructions, or by causing processor 502 to execute instructions which convert the received instructions to instructions which can be directly executed by processor 502.

In alternative embodiments, hard-wired circuitry may be used in place of or in combination with software instructions to implement the present invention. Thus, the present invention is not limited to any specific combination of hardware circuitry and software, nor to any particular source for the instructions executed by the computer system 100.

Computer system 500 of the present invention may run various software to perform a variety of functions. In one embodiment, computer system 500 runs Internet communications protocol software, such as, for example, TCP/IP, which is well known to those skilled in the art. A server runs the HyperTexts Transfer Protocol (HTTP) server software, such as, for instance, CERN or NCSA server software, which are well-known in the art. The computer system 500 also runs software (e.g., HTTP client software) to retrieve an identifier/locator (e.g., a URL).

In one embodiment, the present invention is implemented in software, such as Java or other programming language for distributing applications over the Web. Using such a programming language (e.g., a Java applet) allows any user to use the system without installing new software on their system. Furthermore, this allows tight integration with their Web browser so that their cognitive map may be used instead of linear hotlists or bookmarks. (A bookmark is a list of URL's that the browser keeps track of for the user.)

The present invention is applicable to such areas as personal information management, customized home pages and hotlists for fast retrieval, automatic filing, intelligent searching, and information filtering, to name a few.

The present invention provides an efficient and usable means for structuring information using a system that includes a novel interface for sorting elements, a method for learning metrics that correspond to a user's cognitive organization, and ways to use these metrics for information retrieval, filtering, and usage.

Also, the present invention provides a tool enabling the user to have a custom perspective on the Web. By learning how the user views the world, the system helps the user manage the large amounts of available information.

Whereas, many alterations and modifications of the present invention will no doubt become apparent to a person of ordinary skill in the art after having read the foregoing description, it is to be understood that the particular embodiment shown and described by way of illustration are in no way to be considered limiting. Therefore, reference to the details of the various embodiments are not intended to limit the scope of the claims which themselves recite only those features regarded as essential to the invention.

Thus, a document and information sorting system has been described.

We claim:

1. A system-implemented method for sorting information comprising the system-implemented steps of:

adjusting a similarity measure corresponding to and based on positioning, within a spatial arrangement of a plurality of documents representations on a display, in response to a user positioning a document representation within the spatial arrangement;

presenting an additional document representation on the display;

positioning the additional document representation on the display using the similarity measure.

2. The method of claim 1 wherein the representation similarity measure is based on a set of metrics.

3. The method defined in claim 1 wherein the step of positioning an additional document representation comprises moving icons from an initial position to a preferred position in sequence.

4. The method defined in claim 3 further comprising the steps of:

manually moving one of the icons to a new location on the display; and updating the similarity measure based on the new location of said one of the icons.

5. The method defined in claim 4 further comprising the step of updating at least one feature metric.

6. The method defined in claim 4 wherein the step of updating comprises computing a similarity measure over the set of metrics for a document corresponding to said one of the icons.

7. The method defined in claim 4 wherein the step of updating further comprises adjusting coefficients.

8. The method of claim 1 wherein the individual documents comprise World Wide Web documents.

9. The method defined in claim 1 wherein the step of determining comprises adjusting the similarity measure to reduce a difference between a computed distance and a spatial distance between the positioned document representations.

10. The method defined in claim 1 wherein the step of adjusting the similarity measure comprises adjusting weights associated with feature metrics upon which the similarity measure is based.

11. The method defined in claim 1 wherein the step of adjusting the similarity measure comprises adjusting the similarity measure to match a user's notion of document similarity.

12. The method defined in claim 1 further comprising the step of determining similarity based on underlying metrics that approximate a user's cognitive structuring of the plurality of document representations.

13. An interactive method for sorting information comprising the system-implemented steps of:

developing a spatial structure for a set of documents through interaction with a user positioning document representations, representing the set of documents, on a display based on the spatial structure to create a multi-dimensional document map; and adjusting a similarity measure corresponding to and based on positioning, within the spatial structure, of the document representations on the display, in response to a user positioning a document representation within the spatial structure.

14. The method of claim 13 wherein the spatial structure is developed using a similarity measure comprised of feature metrics.

15. The method of claim 13 wherein the step of developing a spatial structure comprises learning relationships between individual documents in the set of documents that have been positioned by a user.

16. The method defined in claim 13 wherein the step of developing comprises constructing a set of metrics for use in determining document relevance.

17. The method of claim 13 further comprising the step of spatially arranging a plurality of icons on the display according to at least one of the set of metrics.

18. The method defined in claim 13 wherein the step of positioning document representations comprises the steps of:

displaying each document representation at a predetermined location on the display; and moving each document representation to another location on the display based on a set of metrics.

19. The method of claim 18 wherein the step of positioning further comprises the steps of:

manually moving one of the document representations to a new location on the display; and updating the similarity measure to reduce discrepancy between the similarity measure and distance between the document representations.

20. The method of claim 13 further comprising the step of selecting one of the document representations to retrieve its corresponding document in the set of documents.

21. The method of claim 20 wherein the step of selecting comprises positioning a cursor on said one of the document representations using a cursor control device and depressing a button on the cursor control device.

22. The method defined in claim 13 further comprising the steps of:

selecting an area between document representations; and performing a search to locate documents similar to the documents corresponding to the document representations around the selected area.

23. The method defined in claim 22 wherein the step of performing the search locates documents similar to documents nearby the area as determined by the similarity measure.

24. The method defined in claim 22 the step of performing a search comprises the steps of:

constructing a search query; and identifying documents that match the search query.

25. The method defined in claim 22 wherein the step of selecting comprises circling an area.

26. The method defined in claim 13 further comprising the steps of filtering documents based on locations on the display.

27. A method for sorting information comprising:

creating a spatial way out of a plurality of document representations on a display;

identifying a similarity measure based on the spatial arrangement;

adjusting the similarity measure in response to a change being made in the spatial arrangement due to a new placement of a document representation.

28. The method defined in claim 27 wherein the step of determining similarity comprises computing the similarity measure by combining weighted feature metrics.

29. The method defined in claim 28 further comprising adjusting weights of the feature metrics to reduce a difference between a computed distance and a spatial distance of the position document representations.

30. The method defined in claim 27 wherein the step of creating the spatial arrangement comprises creating a cognitive map of document icons arranged according to a user's notion of document similarity.

31. The method defined in claim 27 further comprising the step of manually moving a document representation to a new location.

32. The method defined in claim 27 wherein the step of adjusting the similarity measure comprises adjusting coefficients associated with feature metrics associated with the plurality of document representations.

33. An apparatus for sorting information comprising:

means for creating a spatial way out of a plurality of document representations on a display;

means for identifying a similarity measure based on the spatial arrangement; and means for adjusting the similarity measure in response to a change being made in the spatial arrangement due to a new placement of a document representation.

34. The apparatus defined in claim 33 wherein the means for determining similarity comprises means for computing the similarity measure by combining weighted feature metrics.

35. The apparatus defined in claim 34 further comprising means for adjusting weights of the feature metrics to reduce a difference between a computed distance and a spatial distance of the position document representations.

36. The apparatus defined in claim 33 wherein the means for creating the spatial arrangement comprises means for creating a cognitive map of document icons arranged according to a user's notion of document similarity.

37. The apparatus defined in claim 33 further comprising means for moving a document representation to a new location.

38. The apparatus defined in claim 33 wherein the means for adjusting the similarity measure comprises means for adjusting coefficients associated with feature metrics associated with the plurality of document.

39. A computer system product comprising a computer medium storing executable instructions, which when executed by a processor, cause the system to:

create a spatial way out of a plurality of document representations on a display;

identify a similarity measure based on the spatial arrangement;

adjust the similarity measure in response to a change being made in the spatial arrangement due to a new placement of a document representation.

40. The computer system product defined in claim 39 further comprising executable instructions which, when executed, cause the processor to compute the similarity measure by combining weighted feature metrics.

41. The computer system product defined in claim 40 further comprising executable instructions which, when executed, cause the processor to adjust weights of the feature metrics to reduce a difference between a computed distance and a spatial distance of the position document representations.

42. The computer system product defined in claim 39 further comprising executable instructions which, when executed, cause the processor to create a cognitive map of document icons arranged according to a user's notion of document similarity.

43. The computer system product defined in claim 39 further comprising executable instructions which, when executed, cause the processor to move a document representation to a new location.

44. The computer system product defined in claim 39 further comprising executable instructions which, when executed, cause the processor to adjust coefficients associated with feature metrics associated with the plurality of document representations.

* * * * *